Figure 1:
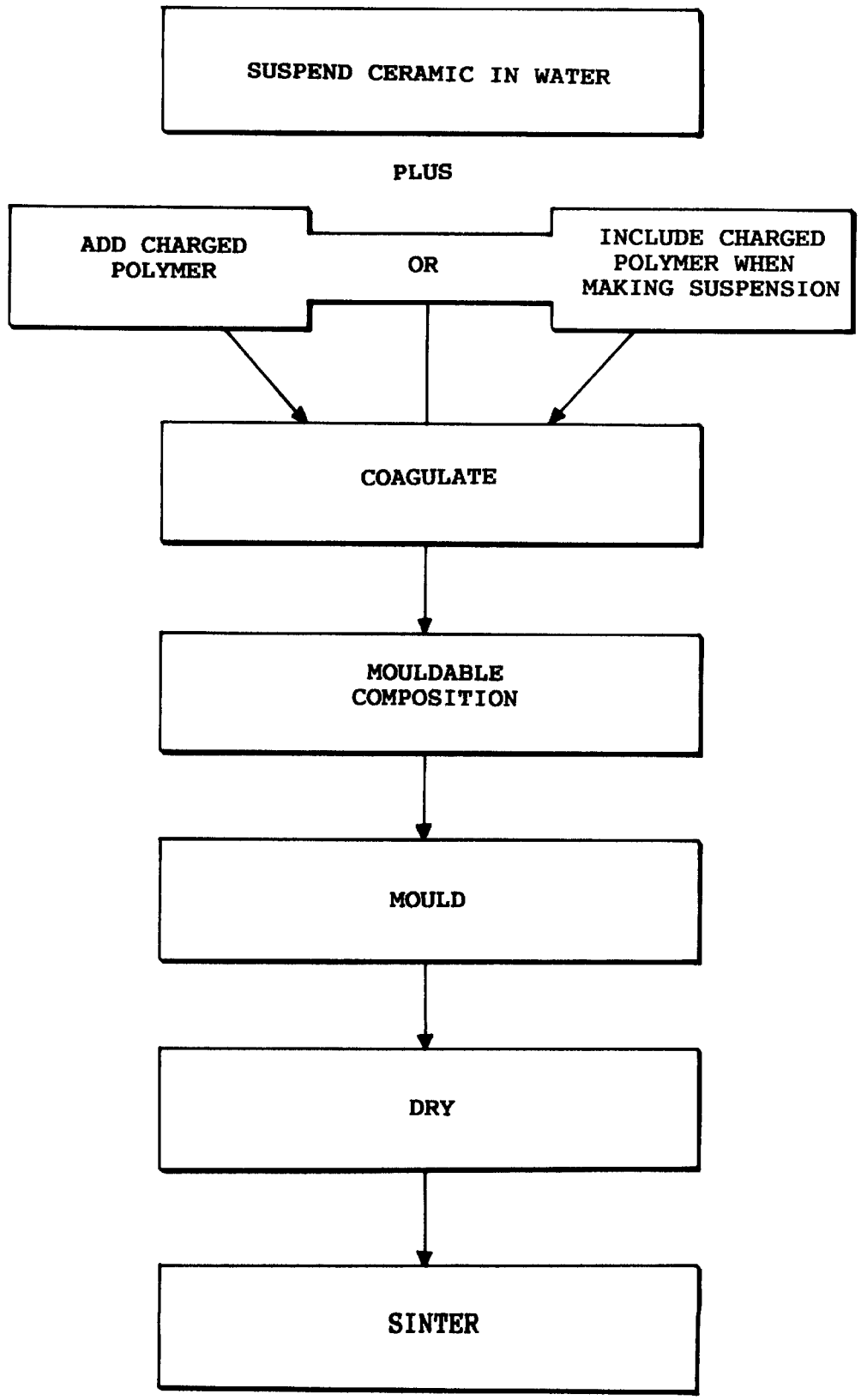

United States Patent [19]
Sambrook et al.

[11] Patent Number: 5,922,272
[45] Date of Patent: Jul. 13, 1999

[54] MANUFACTURE OF CERAMIC ARTICLES

[75] Inventors: Rodney Martin Sambrook, Sheffield; Jon Binner, Nottingshire; Jason Davies, Dyfed; Andrew McDermott, Huddersfield, all of United Kingdom

[73] Assignee: Dytech Corporation Limited, Sheffield, United Kingdom

[21] Appl. No.: 08/776,629

[22] PCT Filed: Jul. 23, 1997

[86] PCT No.: PCT/GB96/01841

§ 371 Date: Mar. 26, 1997

§ 102(e) Date: Mar. 26, 1997

[87] PCT Pub. No.: WO96/04219

PCT Pub. Date: Feb. 15, 1996

[30] Foreign Application Priority Data

Aug. 2, 1994 [GB] United Kingdom ................ 94.155629

[51] Int. Cl.[6] .................................................. C04B 35/622
[52] U.S. Cl. .......................... 264/638; 264/639; 264/650; 264/177.11; 264/211.11; 264/443; 264/41; 264/109
[58] Field of Search ..................... 264/638, 639, 264/650, 177.11, 211.11, 443, 71, 109

[56] References Cited

U.S. PATENT DOCUMENTS 3,692,690 9/1972 Horger .
4,265,841 5/1981 Fujimori ................................ 264/123
4,624,808 11/1986 Lange ..................................... 264/311
4,627,966 12/1986 Micheli .
4,799,601 1/1989 Shimai .
4,904,411 2/1990 Novick et al. .
4,908,172 3/1990 Sterzel .
5,188,780 2/1993 Lange .

FOREIGN PATENT DOCUMENTS 0098119 1/1984 European Pat. Off. .......... 264/211.11
0393226 10/1990 European Pat. Off. .
0415646 3/1991 European Pat. Off. .
2264939 9/1993 United Kingdom .

OTHER PUBLICATIONS

Portions of a book entitled Organic Additives and Ceramic Processing with Applications in Powder Metallurgy, Ink, and Paint by Daniel J. Shanefield.
English translation of Patent Abstract of Japanese patent JP 02141455, May 30, 1990 (Toyota Mtor Corp.).
English translation of Patent Abstract of Japanese patent JP 49046046, Dec. 7, 1974 (Tanabe).
Organic Additives & Ceramic Processing by Daniel J. Shanefield, May 11, 1995 pp. 151–153.

*Primary Examiner*—James Derrington
*Attorney, Agent, or Firm*—Caesar, Rivise, Bernstein, Cohen & Pokotilow, Ltd.

[57] ABSTRACT

A moldable ceramic composition is made by forming the suspension of electrically charged ceramic particles and then coagulating.

23 Claims, 1 Drawing Sheet

MANUFACTURE OF CERAMIC ARTICLES

The invention relates to ceramic articles and in particular to a method of making a mouldable ceramic composition that can be moulded into a ceramic article of high density.

Present methods for making such articles by, for example extrusion or injection moulding, use a dispersion of suitable ingredients and a polymer binder system. Unfortunately, a high polymer content is required and this leads to problems when the article is fired following moulding as the removal of the polymer by combustion can create defects in the product as well as causing pollution.

It is an object of the invention to provide an improved method of making a mouldable ceramic composition from ceramic powder particles.

Accordingly in one aspect the invention provides a method of making a ceramic article by moulding, the method comprising coating particles of ceramic powder by mixing them with an aqueous solution of an electrically charged polymeric material such that the particles acquire an electric charge and a suspension is formed; coagulating the coated particles in the suspension to form a moulding composition; moulding the composition to form the article in the green state; and then dRying and sintering.

In another aspect the invention provides a method of making a mouldable ceramic composition from ceramic powder, the method comprising:

1. Mixing water and electrically charged polymer to form a solution, then adding the ceramic powder to the solution, whereby the ceramic particles acquire an electrically charged polymeric coating and so form a suspension.

2. Modifying the surface charges on the coated particles to cause coagulation.

Preferably the composition is in paste form. By the method of the invention, a ceramic composition may be moulded using established techniques to form ceramic articles of high density and with little or no strength defects while avoiding the release of pollution combustion products.

The invention includes a ceramic article moulded from a ceramic moulding composition and having a high density.

The ceramic particles may be oxides, silicides, carbides, nitrides and the like. Specific materials include alumina, silica, zirconia, barium titanate, silicon carbide; and the like.

The effect of the charged polymer is to disperse the ceramic particles by coating them with a surface charge which has the effect of repelling adjacent particles. The content of the charged polymer is preferably less than about 1 wt % relative to the total weight, most preferably below about 0.5 wt % for charged polymers of average molecular weight of about 3500. Contents of up to 5 wt % or more may be required for higher molecular weight charged polymers. Excessive concentrations of charged polymer may lead to depletion flocculation, and so should be avoided. The polymer material may be ammonium polyacrylate, a polyacrylate derivative, a cellulose derivative, or the like The water to which the charged polymer is added is preferably deionised.

When the ceramic powder is added to the polymer solution, it may be in sufficient proportion to produce a highly concentrated suspension, which is subsequently subjected to ultrasonic agitation. Alternatively, the suspension may be prepared as above but with a lower powder concentration, to enable the fractionation of hard agglomerates. The suspension is then consolidated to a high concentrated suspension.

If necessary a small quantity of polymeric binder may be added to provide adequate green strength to the moulded article and prevent water migration during the forming process. The polymeric binder material may be used, for example, in an amount of up to 2% of the total suspension weight. The binder provides green strength to the material and can prevent excessive migration of water during the shaping process. The polymeric binder material is preferably selected to be one which does not interact with the charged polymer. It may be, for example, polyvinyl alcohol, polyethylene glycol or a cellulose derivative; or the like.

The coagulation step is achieved by modifying the charge on the surface of the coated particles. A number of techniques may be used, for example:

1. Addition of a salt to the suspension, whereby the charges on the polymer are neutralised, allowing the attractive forces between the particles to act thereby causing coagulation. If the selected salt does not alter the pH of the suspension towards the isoelectric point of the ceramic powder, it is a necessity that the pH of the salt be substantially that of the isoelectric point of the ceramic powder.

The salt is preferably a material which ionises when dissolved in water, examples of which includes the chloride, carbonate, sulphate, nitrate or formate of ammonia, magnesium, zirconium, yttrium. cerium, titanium; and the like.

2. Addition of sufficient of a selected acid or alkali to the suspension to shift the pH to substantially that of the isoelectric point of the ceramic powder. The acid of alkali must be rather weak, such that shifting the pH to excessively beyond the isoelectric point of the ceramic powder is avoided. Examples includes: acid, ammonia solution and the like.

The coagulation additive may be used in a variety of ways, depending on the moulding technique to be used.

For extrusion and rolling, the additive (salt, acid, alkali) may be added to coagulate the suspension, thereby forming a body of a paste-like consistency which may be extruded or rolled. Varying the salt concentration, charged polymer content and powder concentration can alter the properties of the pastes. Inherent impurities in the powder may be used to induce coagulation at appropriate polymer concentrations.

For pour moulding and tape casting the following may be used:

A sequestered salt ion complex (i.e. a soluble deactivated salt) may be dissolved into the suspension and in turn added to the mould cavity. Upon altering the physical conditions of the suspension, for example by heating, the complex decomposes thereby releasing the salt ions and initiating coagulation. This ensures the uniform distribution of salt ions.

A water dispersible species which is not ionized or is only very weakly ionized may be incorporated into the suspension and in turn added to the mould cavity. Upon altering the physical conditions of the suspension, for example by heating, the species may ionize, thereby coagulating the suspension. Examples of the species include urea.

A water dispersible species which is not ionized or is only very weakly ionized may be incorporated into the suspension and in turn added to the mould cavity. Upon altering the physical conditions of the suspension, for example by heating, the species may produce either hydrogen or hydroxyl ions that shift the pH of the suspension appropriately, thereby coagulating the suspension, e.g. examples include organic esters, salts of organic acids, etc.

The suspension may be poured into a mould containing salt ions and the mould subsequently vibrated to dissolve the ions and coagulate the mixture simultaneously. Alternatively, the suspension may be poured into the mould with salt subsequently introduced into the suspension, followed by vibration.

For pour moulding and tape casting the concentration of ceramic powder and coagulation species need to be in sufficient quantity, such that upon coagulation the body becomes rigid.

For vibration moulding the additive (salt, acid, alkali) may be added to coagulate the suspension, thereby forming a body of a paste-like consistency. The mass may then be placed into a mould cavity and the mould subsequently vibrated to facilitate mould fill.

For gelcasting, a salt of a monomer together with an initiator and a catalyst may be added to the suspension to form a coagulated body which becomes rigid upon polymerisation. For this, a higher concentration of dispersing charged polymer is required than for production of a paste.

Once formed the body is dried and sintered. High density, e.g. 95–100% of theoretical density, moulded articles can be conveniently made by the method of the invention. Articles of lower density could be produced by adding sacrificial filler material or gas (e.g. $CO_2$).

The invention is illustrated by the accompanying FIGURE which is a flow diagram illustrative of the steps of the method.

The invention is further illustrated with reference to the following examples by way of illustration only showing the method applied to the production of bodies by extrusion.

EXAMPLE 1

18.70 g of deionised water and 0.30 g Dispex A40, (37.6 wt % aqueous solution of ammonium polyacrylate of average molecular weight 3500), were mixed together to form a solution, 81.00 g of alumina powder was then added. The mixture was stirred until a homogeneous suspension resulted and left for 1 hour to allow adsorption of the dispersant onto the alumina. The suspension was agitated ultrasonically for 1.5 min. Then 0.81 g (0.80 M of ammonium chloride coagulant was added and mixed until a homogeneous coagulated paste was formed. The paste was extruded through a 3 mm die at the rate of 5 mm. $min^{-1}$ The extrudate was dried and sintered to form a rod having a density of 98% of theoretical, a strength of about 349 MPa and an average grain size of 1.3 um.

A paste similar to that just prepared was produced, but 0.38 g. of methylcellulose was added to the suspension before the addition of 0.81 g salt. The force required for extrusion was relatively low, about 0.34 KN. The extrudate had a density was 98% of theoretical, a strength of 355 MPa and produced grains with an average size of 1.3 um. upon sintering.

EXAMPLE 2

A paste comprising of 17.54 g deionised water, 0.46 g Dispex A40, 82.00 g alumina 0.36 methylcellulose and 0.78 g ammonium chloride was produced and extruded, the force required being 0.65 KN. The sintered extrudate was found to have a density of 98% of theoretical, and a strength of 318 MPa.

EXAMPLE 3

A coagulated paste comprising of 17.70 g deionised water, 0.30 g. Dispex A40, 81.00 g alumina, 0.38 g methylcellulose and 0.81 g ammonium chloride was produced. The paste was extruded twice through a 3 mm die at a rate of 100 mm $min^{-1}$, a force of approx 0.7 KN was necessary to facilitate this. The resulting extrudate had a sintered density of 98% of theoretical and a bend strength of 397 MPa. The article after sintering had an average grain size of approx 1.2 um.

EXAMPLE 4

19.00 g deionised water and 81.00 g of alumina powder were thoroughly mixed together to form a paste and 0.38 g of methycellulose was added. The paste was left for 24 hours and then extruded through a 3 mm die at the rate of 5 mm $min^{-1}$. The force required for extrusion was about 1.4 KN and the density of the produced green body was found to be 2.19 $g.cm^{-3}$. The sintered extrudate had a density of 99% of theoretical, a three point bend strength of 308 Mpa and consisted of particles average grain size of 1.3 um.

The mixture was stirred until a homogenous suspension resulted. This was agitated ultrasonically for 1.5 min. Then 0.2 g (0.25 M) of ammonium chloride was added and mixed until a homogenous paste was formed. The paste was extruded through a 3 mm die and the extruded product was fired at 1550 C° for 2 h. to form a hard extrudate having a density of 97% of theoretical.

We claim:

1. A method of molding a ceramic article, comprising the steps of mixing together water and an electrically charged dispersant polymer to form a solution, adding particles of ceramic material and agitating to form a substantially homogeneous suspension; allowing the dispersant to be adsorbed on to the particles; adding a coagulant and mixing to form a paste; and extruding the paste to form the article.

2. A method according to claim 1, wherein the dispersant polymer makes less than 5% by weight of the suspension.

3. A method according to claim 2, wherein the dispersant polymer makes up less than 1% by weight of the suspension.

4. A method according to claim 3, wherein the dispersant polymer makes up less than 0.5% by weight of the suspension.

5. A method according to claim 4, wherein the dispersant polymer is ammonium polyacrylate having a molecular weight of about 3500.

6. A method according to claim 1, wherein the water is deionized.

7. A method according to claim 1, wherein the coagulant is a salt which ionizes when dissolved in water.

8. A method according to claim 7, wherein the salt is the chloride, carbonate, sulphate, or formate of ammonium, magnesium, zirconium, yitrium, cerium or titanium.

9. A method according to claim 8, wherein the coagulant is ammonium chloride.

10. A method according to claim 1, wherein the coagulant is an acid or alkali which will shift the pH of the suspension to substantially the isoelectric point of the ceramic particles.

11. A method according to claim 1, wherein a polymeric binder is added to the substantially homogeneous suspension.

12. A method according to claim 11, wherein the polymer binder is polyvinylalcohol, polyethylene glycol or a cellulose.

13. A method according to claim 11, wherein the polymeric binder is added in an amount which makes up to 2% of the suspension.

14. A method according to claim 1, including the subsequent step of drying and then sintering the molded article.

15. A method of molding a ceramic article, comprising the steps of mixing together water and an electrically charged dispersant polymer to form a solution; adding particles of the ceramic powder and agitating to form a substantially homogeneous suspension, allowing the dispersant to be adsorbed on to the particles; adding a coagulant to the suspension; introducing the suspension into a mold and supplying heat to initiate coagulation.

16. A method according to claim 15, wherein the coagulant is a sequestered salt ion complex.

17. A method according to claim 16, wherein the coagulant comprises a urea.

18. A method of molding a ceramic article, comprising the steps of mixing together water and an electrically charged dispersant polymer to form a solution; adding particles of the ceramic powder and agitating to form a substantially homogeneous suspension, allowing the dispersant to be adsorbed on to the particles; introducing the suspension into a mold and adding a coagulant to the suspension in the mold and agitating the mold to dissolve and coagulate the suspension.

19. A method according to claim 18, wherein the dispersant polymer makes less than 5% by weight of suspension.

20. A method according to claim 19, wherein the dispersant polymer makes up less than 1% by weight of the suspension.

21. A method according to claim 19, wherein the dispersant polymer makes up less than 0.5% by weight of the suspension.

22. A method according to claim 21, wherein the dispersant polymer is ammonium polyacrylate having a molecular weight of about 3500.

23. A method according to claim 18, wherein the water is deionized water.

* * * * *

UNITED STATES PATENT AND TRADEMARK OFFICE
CERTIFICATE OF CORRECTION

PATENT NO. : 5,922,272
DATED : July 13, 1999
INVENTOR(S) : Rodney Martin Sambrook et al.

It is certified that error appears in the above-identified patent and that said Letters Patent is hereby corrected as shown below:

On the title page: Item [22] change

PCT Filed: "Jul. 23, 1997" to --Aug. 2, 1995--;

PCT No.: "PCT/GB96/01841" to --PCT/GB95/01841--.

Signed and Sealed this

Ninth Day of November, 1999

Attest:

Q. TODD DICKINSON

Attesting Officer

Acting Commissioner of Patents and Trademarks